United States Patent [19]

Colegrove

[11] Patent Number: 5,289,189
[45] Date of Patent: Feb. 22, 1994

[54] TRACK HANDOVER BETWEEN REGIONS WITHIN A SURVEILLANCE AREA

[75] Inventor: Samuel B. Colegrove, Highbury, Australia

[73] Assignee: The Commonwealth of Australia, Canberra, Australia

[21] Appl. No.: 889,970

[22] Filed: May 29, 1992

[30] Foreign Application Priority Data

May 31, 1991 [AU] Australia ............... PK6440

[51] Int. Cl.⁵ ................................................ G01S 13/72
[52] U.S. Cl. ........................................ 342/95; 342/96; 342/25
[58] Field of Search ................ 342/96, 95, 94, 25

[56] References Cited

U.S. PATENT DOCUMENTS

| | | | |
|---|---|---|---|
| H126 | 9/1986 | Allen et al. | 342/75 |
| H910 | 4/1991 | Hindenach | 342/25 |
| 4,124,848 | 11/1978 | Clark et al. | 340/524 |
| 4,160,974 | 7/1979 | Stavis | 244/3.19 X |
| 4,224,618 | 9/1980 | Rich et al. | 342/182 |
| 4,336,540 | 6/1982 | Goodwin et al. | 342/157 |
| 4,536,764 | 8/1985 | Freeman | 343/5 |
| 4,825,213 | 4/1989 | Smrek | 342/25 |
| 4,829,303 | 5/1989 | Zebker et al. | 342/25 |
| 4,845,500 | 7/1989 | Cornett et al. | 342/90 |
| 4,989,008 | 1/1991 | Fujisaka et al. | 342/25 |
| 4,991,147 | 2/1991 | Remley et al. | 367/123 |
| 5,059,966 | 10/1991 | Fujisaka et al. | 342/25 |
| 5,130,715 | 7/1992 | Yanagisawa | 342/158 |
| 5,132,686 | 7/1992 | Witte | 342/25 |
| 5,132,689 | 7/1992 | Van Wyk | 342/96 |
| 5,138,321 | 8/1992 | Hammer | 342/36 |

FOREIGN PATENT DOCUMENTS

| | | | |
|---|---|---|---|
| 431979 | 1/1973 | Australia | G01S 13/72 |
| 60-254749 | 5/1987 | Japan | G01S 13/90 |

*Primary Examiner*—John B. Sotomayor
*Attorney, Agent, or Firm*—Cushman, Darby & Cushman

[57] ABSTRACT

A method of reducing tracking errors in an area comprised of touching surveillance regions which involves; transmitting a plurality of signals into a region, receiving signals scattered from the region and analyzing the received signals using a processing means, to produce target measurements; dividing each region into a number of zones comprising an edge zone at each edge of said region and one or more center zones; associating target measurements with appropriate zones; apportioning said measurements into data blocks on a storage means such that each pair of adjoining edge zones form a single data block and each central zone forms a data block; updating target tracks in each data block using said target measurements; allocating target tracks from each data block to the correct region; and displaying the tracks on a visual display means. A separate list of tracks for those targets contained in the edge track zone of touching regions is maintained. In this way a single track will be maintained for a target moving in the edge zones thereby reducing the likelihood of tracking errors. The invention is particularly useful for radar tracking systems.

22 Claims, 1 Drawing Sheet

TRACK HANDOVER BETWEEN REGIONS WITHIN A SURVEILLANCE AREA

BACKGROUND OF THE INVENTION

The invention disclosed herein relates to automatic track handover for automatic target tracking systems on track-while-scan surveillance sensors where the surveillance area is divided into regions which touch.

In its most general sense the invention can be applied to any automatic tracking system for a surveillance sensor whose surveillance area is divided into touching regions where each region has a separate data collection time. The invention also applies to surveillance sensors which have multiple surveillance areas where each area consists of single or multiple regions which touch. A region is defined as the extent of the field of view of a surveillance sensor during the time it gathers data for either or both coherent and incoherent processing. Wide area surveillance is achieved by arranging regions such that one region will abut another.

In providing a background discussion of track handover, reference will be made to the case where the regions are divided in azimuth and the tracking operation is based on recursive estimation. The regions could equally be divided by range. The example of division by azimuth is particularly applicable to operation of an over-the-horizon radar system which achieves very wide area surveillance by abutting a number of regions, each region being formed by a number of beams.

The presence of a target is determined by signal to noise considerations after signal processing to enhance the target feature. For a particular target model, a tracking filter calculates the predicted target position in, for instance, range and bearing. The position calculation is at the time associated with the sensor's region data. The predicted position for each target is used to search the sensor's data for candidate target measurements. Once the measurements are selected they are used to update the tracking filter's target state estimate.

Target state estimates are maintained in data blocks in solid state memory. The data blocks are arranged to minimise the amount of memory space that must be accessed when updating target state estimates.

The target state estimate is a vector which consists of component estimates derived from either directly or indirectly measured parameters of a distinct object. For example, a radar may make measurements in range and bearing and the state estimate may contain the components of range, range-rate, bearing and bearing-rate. At any given time the estimated position of a target is a function of the latest measurement and the weighted effect of previous measurements.

When the track position approaches the boundary of a region which touches an adjoining region, the effect of sensor measurement scintillation causes the sensor to produce target measurements in the adjoining region. If no allowance is made for the same target to give measurements from different regions, duplicate tracks on the same target can result and the tracking errors can increase when the target approaches the boundary. This is particularly evident for targets which travel along the edge of touching regions.

Another complication associated with tracking systems for surveillance areas subdivided into touching regions is the processing overheads for sorting and selected tracks. This invention includes an approach which minimises these overheads for surveillance sensors having large track capacities, i.e. greater than 1000.

It is the intended object of this invention to alleviate one or more of the above mentioned problems or at least provide a useful alternative.

SUMMARY OF THE INVENTION

Therefore, according to one form of this invention there is proposed a method of reducing tracking errors in an area comprised of touching surveillance regions which involves:

transmitting a plurality of signals into a region;

receiving signals scattered from the region;

analyzing the received signals using a processing means to produce target measurements;

dividing each region into a number of zones comprising at least one edge zone at edges of said region and at least one center zone;

allocating target tracks to data blocks on a storage means;

associating target measurements with appropriate target tracks;

updating target tracks in each data block using said target measurements;

allocating target tracks from each data block to the correct zone; and displaying the tracks on a visual display means.

A key aspect of this invention is that there is a separate list of tracks for those targets contained in the edge track zone of touching regions. In this way a single track will be maintained for a target moving in the edge zones thereby reducing the likelihood of tracking errors.

In preference each zone may vary in size relative to a region, from equal to the region to zero. It is only necessary to maintain edge zones adjacent the boundary between regions. Thus a region adjoined in azimuth or range may contain one edge zone and a center zone, two edge zones and a center zone or no center zone. A region adjoined in both azimuth and range may contain up to four edge zones.

In preference the size of each edge zone is a combination of an allowance for measurement scatter, say three times the standard deviation of the scatter of the target measurement plus a factor to prevent targets at maximum velocity bypassing the edge track zone. A typical azimuth edge zone covers from 1 to 2 receive beams for an over-to-horizon radar.

In preference there is a fixed number of tracks associated with each region. This number can be either the same or different from zone to zone and is based on the expected maximum number of tracks in the zone plus a margin to allow for track capacity estimation errors. By defining a fixed number of tracks per zone the track sorting computational load on the tracking system is limited.

In preference the step of updating target tracks includes the step of updating a target state estimate to include the probability that the target measurement is not selected because of the region edge effect.

One possible visual display means is an Azimuth Range Velocity Display as described in copending Australian Patent Application Number PK6000.

In a further form the invention can be said to reside in a method of reducing tracking errors in an area comprised of touching surveillance regions which involves:

transmitting a plurality of signals into a region;

receiving signals scattered from the region;

analyzing the received signals using a processing means to produce target measurements;

dividing each region into a number of zones comprising at least one edge zone at edges of said region and at least one center zone;

if not previously allocated then allocating target tracking filters into appropriate zones based on track position;

selecting measurements to update each target track using a Probabilistic Data Association filter method;

calculating a probability term which is the probability of the target measurement being within the selected measurements from a probability density function for target measurements centred on the target track predicted position and integrated over the volume containing the measurements;

updating target tracks in each zone using said measurements and the probability term for a target measurement being selected; allocating target tracks to the correct zone; and displaying the tracks on a visual display means.

A Probabilistic Data Association filter is described in "Track Initiation and Nearest Neighbours Incorporated into Probabilistic Data Association", Journal of Electrical and Electronics Engineering, Australia Vol. 6, No. 3, September 1985.

BRIEF DESCRIPTION OF THE DRAWINGS

For a better understanding of this invention a preferred embodiment will now be described with reference to the attached drawings in which.

DESCRIPTION OF THE PREFERRED EMBODIMENT

Figure 1:
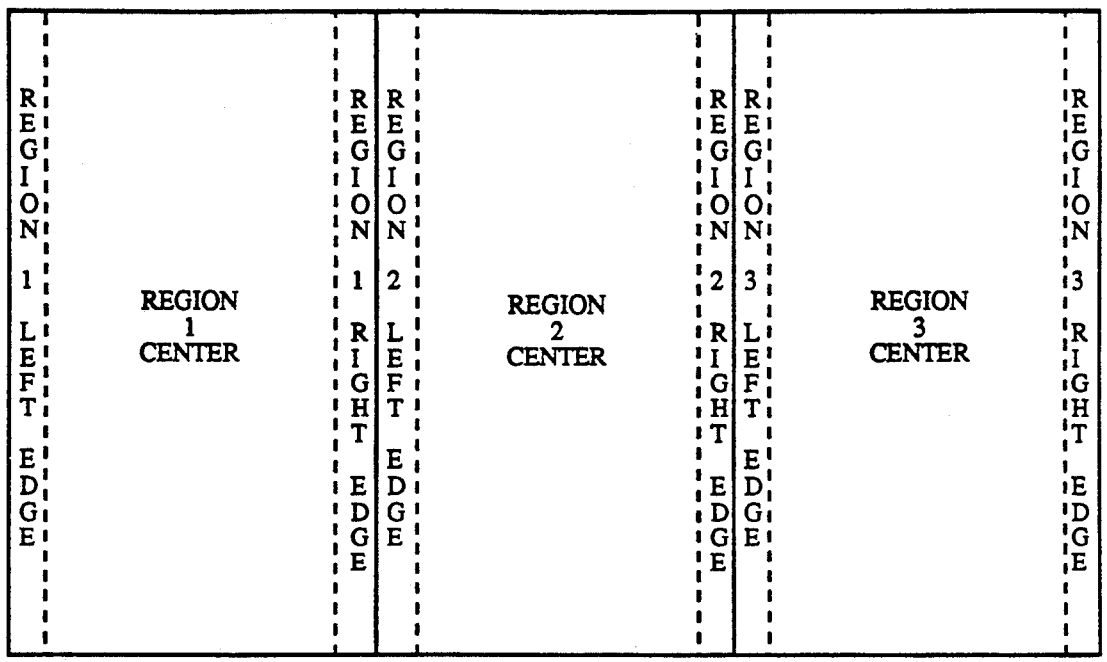
FIG. 1 illustrates the case of three regions touching in azimuth.

In FIG. 1 there is shown an example of a surveillance area divided into a number of regions of which three are shown. Each region is divided into centre, left and right edge zones. In this embodiment the edge zones each cover approximately 10% of the region.

Figure 2:
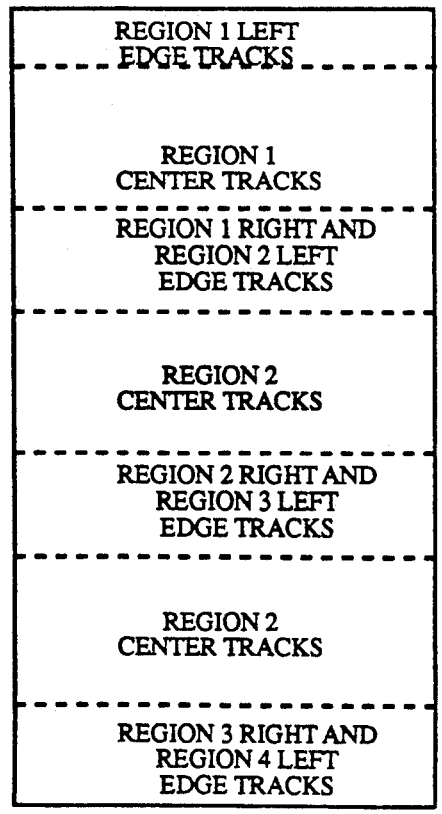
FIG. 2 illustrates a memory organisation of the track data associated with these regions.

In FIG. 2 the memory organisation is divided in a similar manner to the geographical layout except that the tracks associated with edge zones of touching regions are combined into a composite area with Region 'n' Left Edge Track and Region 'n+1' Right Edge Tracks. Other memory organisations are possible. For example the centre tracks and the edge tracks could be in different arrays with alternative ordering.

Prior to the receipt of new sensor measurement data from a region, the track data associated with each zone are sorted in figure of merit or confidence from the previous update of the track estimates. When data from a region are available to update the track estimates, the centre and edge tracks are used for selecting sensor measurements. For example when sensor data are available from Region 2, the tracks selected for update are: the Region 1 Right and Region 2 Left Edge Tracks; the Region 2 Centre Tracks and; the Region 2 Right and Region 3 Left Edge Tracks.

Once the measurements obtained from sensor measurement data are associated with the respective tracks, the target state estimate is updated. For a tracking filter based on Probabilistic Data Association allowance can be made for the case when the predicted target position is not totally contained in the sensor measurement data. Here the term denoting the probability of selecting a target measurement is scaled down by the integral of the predicted target measurement probability density function over the area of the selected measurements. Also the measurement error covariance values for the filter can be adjusted for those cases where the sensor measurements degrade near the edge of a region.

After this operation the position of the tracks changes therefore it is necessary to test the position of the tracks to transfer them to the correct centre and edge track arrays. In the example considered the test uses the angle of Region 2 left and region 2 right edges. Based on the azimuth of each track they are firstly transferred to centre and edge track locations in a temporary track array. Following this step they are then sorted in confidence and copied to the track data structure illustrated by FIG. 2. Thus a target moving clockwise in azimuth will move from say region 1 centre to region 1 right and region 2 left edge. From there it moves into the region 2 centre and so on.

This approach prevents duplicate tracks from starting when targets are in the region edge zone because all the tracks in this zone are used for track update from measurement data from both regions in the edge zone. This approach also limits the size of the arrays to be sorted by only sorting those associated with either the centre or edge zones. By maintaining a fixed track array size with the tracks sorted in confidence, the lowest confidence tracks are overwritten when new tracks enter a region zone. This only impacts on performance when the array size is not adequate. As well as reducing the amount of track sorting, the fixed array size also allows better utilisation of computers which incorporate array processors.

The data storage means may be any addressable solid state memory although multi-port memory has advantages when dealing with large data blocks. Multi-port memory is also well suited to interfacing to array processors.

It will be appreciated that the invention described herein could be exhibited in a number of embodiments which would be apparent to a person skilled in the art. For example, the region could be divided in both azimuth and range. This will produce a situation where sensor data from Region 2 will be used to update tracks in: Region 1 Right Edge and Region 2 Left Edge; Region 2 Centre; Region 2 Right Edge and Region 3 Left Edge; Region 2 Top Edge and the bottom edge of the region above; Region 2 Bottom Edge as well as the top of the region below. Tracks in the four corner regions are placed in the azimuth edge zone to simplify processing and because priority is placed on targets with a radial component. Thus sensor data from Region 2 will update tracks in up to four surrounding regions as well as Region 2.

It will be apparent from the above that the invention could provide a means to alleviate one or more of the disadvantages associated with tracking targets through the join of touching regions. It also reduces the size of the track arrays to be sorted after track update.

Throughout this specification the purpose has been to illustrate the invention and not to limit this.

I claim:

1. A method of reducing tracking errors in an area comprised of stationary touching surveillance regions, a first region having an edge zone touching an edge zone of a second region, the method comprising steps of:

transmitting a plurality of signals into one of the first and second regions;

receiving signals scattered from the transmitted signals;

analyzing the received signals using a processing means to produce target measurements;

storing target tracks in data blocks of a storage means, one block being shared by tracks of targets in the touching edge zones of the first and second regions;

associating target measurements with appropriate target tracks;

updating target tracks in each data block using said target measurements;

allocating target tracks from each data block to the correct zone; and displaying the tracks on a visual display means.

2. The method of claim 1 in which the step of analyzing the received signals using a processing means to produce target measurements includes producing a target state estimate said estimate including the estimated position of the target.

3. The method of claim 2 in which the estimated position of a target is a function of the most recent measurement and the weighted effect of previous measurements.

4. The method of claim 1 in which the size of each zone is between 0% and 100% of the size of the region.

5. The method of claim 4 in which the region is divided into two edge zones and a center zone.

6. The method of claim 4 in which the region is divided into four edge zones and a center zone.

7. The method of claim 4 wherein each region is divided in azimuth into a number of zones.

8. The method of claim 4 wherein each region is divided in range into a number of zones.

9. The method of claim 4 wherein each region is divided in azimuth and range into a number of zones.

10. The method of claim 1 in which the storage means is addressable solid state memory.

11. The method of claim 1 in which the step of updating target tracks includes the step of updating a target state estimate.

12. The method of claim 1 in which the visual display means is an azimuth range velocity display.

13. A method of reducing tracking errors in an area comprised of stationary touching surveillance regions, a first region having an edge zone touching an edge zone of a second region, the method comprising steps of:

transmitting a plurality of signals into a first region;

analyzing the received signals to produce target measurements;

selecting a set of measurements to update a track of a first target at least in part using a Probabilistic Data Association filter method;

calculating a probability of a measurement of the first target being within the selected set;

updating target tracks in each zone using measurements of the set and the calculated probability;

allocating target tracks to the correct zone; and displaying the tracks on a visual display means.

14. The method of claim 13 in which the step of analyzing the received signals using a processing means to produce target measurements includes producing a target state estimate said estimate including the estimated position of the target.

15. The method of claim 14 in which the estimated position of a target is a function of the most recent measurement and the weighted effect of previous measurements.

16. The method of claim 13 in which the storage means is addressable solid state memory.

17. The method of claim 13 in which the step of updating target tracks includes the step of updating a target state estimate.

18. The method of claim 13 in which the visual display means is an azimuth range velocity display.

19. The method of claim 13 wherein the calculating step includes steps of:

determining a probability density function centered on a predicted position of the first target, wherein an integration of the function ascribes a probability that a measurement corresponds to the first target; and integrating the density function over a volume containing the set of measurements.

20. A method for tracking targets in first and second stationary sensor regions, the first region having an edge zone touching an edge zone of the second region, the method comprising steps of:

establishing a first track for a target in the edge zone of the first region;

storing the first track in a memory block that is shared by tracks of targets in touching edge zones of the first and second regions;

transmitting surveillance signals into the second region;

receiving signals from the second region;

deriving update measurements from the update signals;

associating the update measurements with the first track;

updating the first track using the update measurement.

21. The method of claim 20 wherein the associating step includes a step of calculating a probability that an update measurement corresponds to the first track according to a Probabilistic Data Association Method.

22. The method of claim 21 wherein the probability calculating step includes steps of:

integrating a predicted target measurement probability density function over an area of selected measurements; and reducing the probability that the update measurement corresponds to the first track according to the integration result.

* * * * *